United States Patent [19]

Parks

[11] 3,833,824

[45] Sept. 3, 1974

[54] RADIATION HARDENED FLIP-FLOP

[75] Inventor: Kenneth B. Parks, Staley, N.C.

[73] Assignee: The United States of America as represented by the Secretary of the Army, Washington, D.C.

[22] Filed: Sept. 6, 1972

[21] Appl. No.: 286,789

[52] U.S. Cl. .............. 307/291, 307/308
[51] Int. Cl. .............. H03k 3/286
[58] Field of Search .............. 307/289, 291, 308

[56] References Cited

UNITED STATES PATENTS

| | | | |
|---|---|---|---|
| 3,700,930 | 10/1972 | Gonzalez | 307/308 X |
| 3,731,119 | 5/1973 | Matzen | 307/291 |

*Primary Examiner*—John Zazworsky
*Attorney, Agent, or Firm*—Lawrence A. Neureither; Leonard Flank; Robert C. Sims

[57] ABSTRACT

Two inductors are inserted in series with the controlling transistors' paths to ground, and diodes shunt the inductors. Further diodes are back connected between the base circuits of the controlling transistors and ground. A third inductor shunted by a diode is connected between the base circuits of the toggle transistors and ground. The time constants of these circuits are selected such that the flip-flop returns to its initial state after a high radiation level has subsided due to the stored energy in one of the inductors.

1 Claim, 5 Drawing Figures

RADIATION HARDENED FLIP-FLOP

BACKGROUND OF THE INVENTION

This disclosure is related to the field of flip-flop circuits. More particularly this disclosure is related to the retention of the binary state in a flip-flop through a nuclear blast. Flip-flop circuits upon entry into a nuclear environment, generate photocurrent in their transistors, thus tending to drive them into saturation. Flip-flops of the prior art cannot maintain their state in the event of a nuclear blast as the radiation therefrom would drive the transistors into saturation, and once the radiation has subsided the circuit will go to a random state.

SUMMARY OF THE INVENTION

The flip-flop circuits of this invention retain their initial binary state through a nuclear blast by storing energy in one of two inductors which are connected in series with the primary transistors of the flip-flop. The inductor in which the energy is stored is determined by the initial state of the flip-flop. Upon entry into a nuclear environment, photocurrents are generated in the transistors of the circuit, thus tending to drive them into saturation. The stored energy in one of the inductors which is connected in series with one of the transistors will start producing a forward biased voltage to the base of that transistor when the current therethrough begins to turn off. The forward biased voltage is generated across the diode connected parallel with this inductor, and the amplitude of this voltage is sufficient to keep the transistor turned on due to a sufficiently high base to emitter bias. The other inductor, not having any stored energy therein, will not prevent the other transistor of the flip-flop from turning off. Indeed, this inductor will inhibit the turning on of the other transistor.

The rate of decay of the inductor-diode circuit is determined by the time constant of the circuit and can be varied by varying the parameters thereof. If the time constant is sufficiently long to outlast the high radiation level, then the stored energy in the inductor will prevent the desired transistor from being turned off. In this way the initial state of the flip-flop will be maintained.

In one embodiment a pair of compensating diodes are tied to the bases of the two transistors respectively to provide a current path for the primary photocurrents generated thereby due to a nuclear blast. This prevents a current being generated in the base circuit of the transistors tending to turn either of them on.

When the flip-flop is used in a counter, a toggle circuit is provided for changing the states. If a toggle input had been entered just previous to the nuclear blast, the loss of this signal is prevented by the introduction of a further inductor connecting the base circuits of the toggle transistors to ground. A further diode is connected in shunt with this inductor, and if the inductor is completely charged by a toggle input pulse, then the discharge time constant of this inductor through the diode would be great enough to prevent false toggling when a previous stage flip-flop, not shown, reverts back to its proper state.

DESCRIPTION OF THE PREFERRED EMBODIMENTS

Figure 1A:
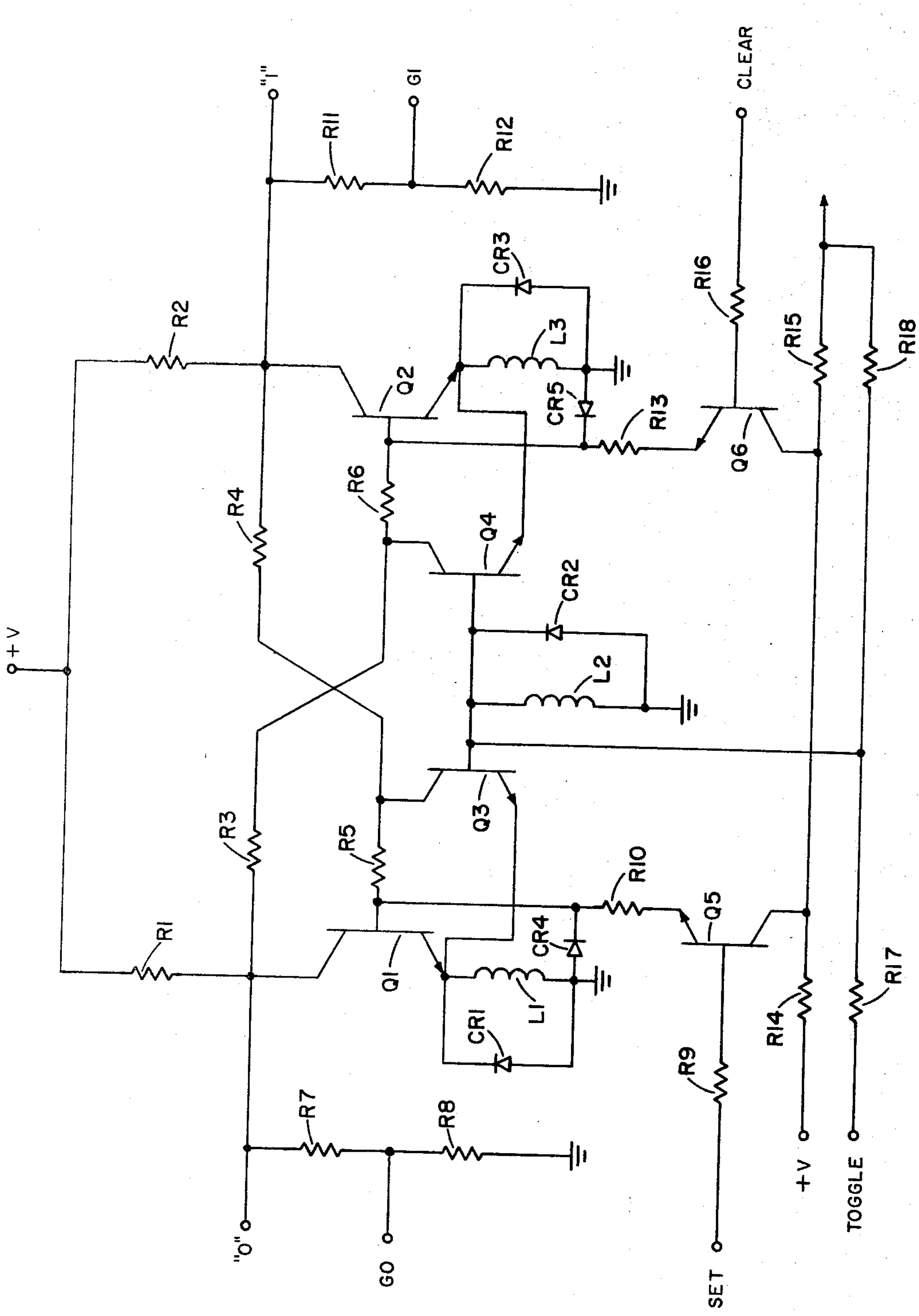
FIG. 1A is a schematic showing of one embodiment of the invention.
Figure 1B:
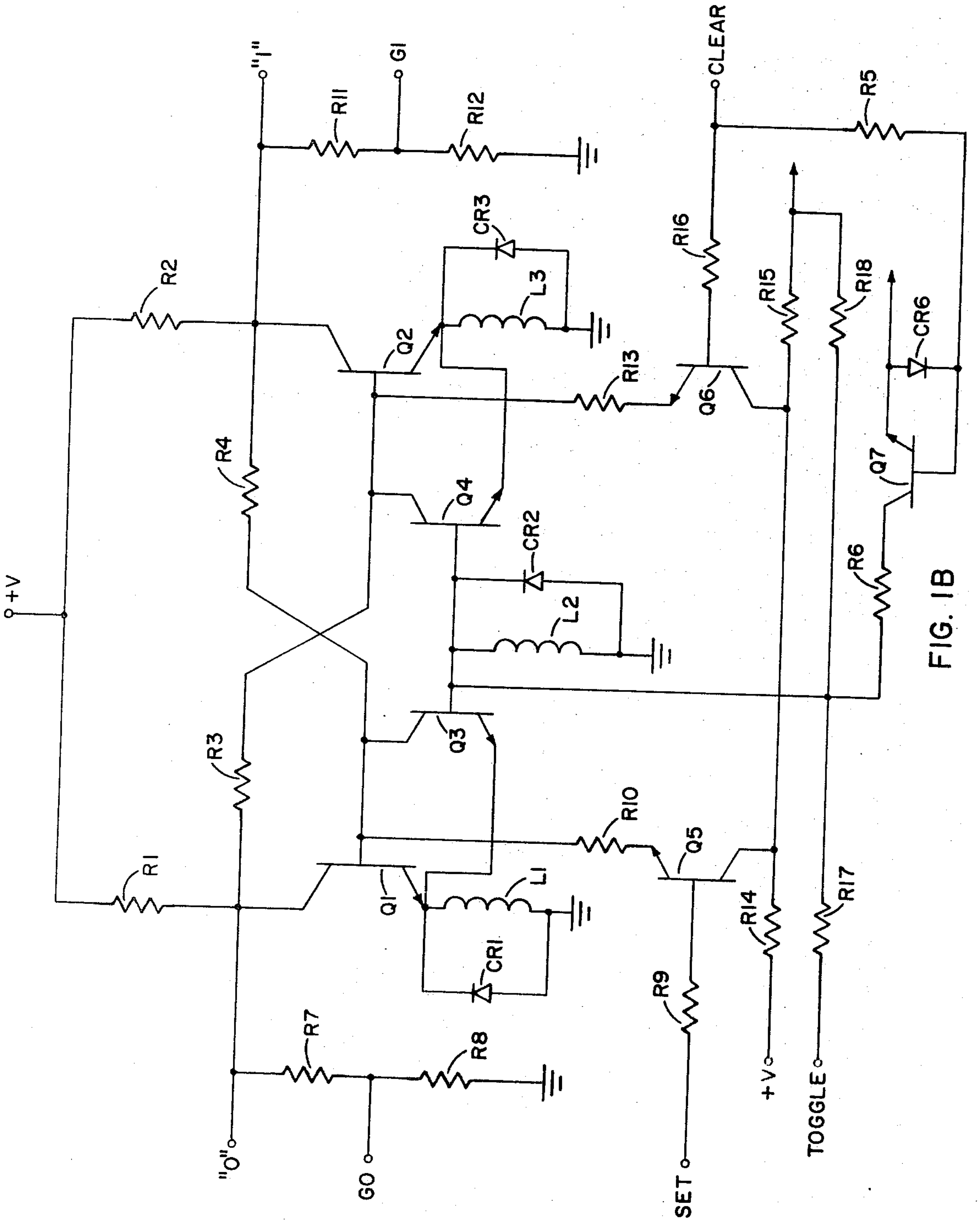
FIG. 1B is a schematic showing of an alternate embodiment of the invention.

The bistable unit is a toggle-set-reset flip-flop. The flip-flop's electrical schematic is shown in FIGS. 1A and 1B. Like elements are labeled the same. The units have each been designed to be used in a low speed counter which has the capability of retaining its binary state through a nuclear radiation environment. The radiation hardened flip-flop provides an acceptable measure of binary state memory both during and after being subjected to a nuclear radiation environment.

The primary discrete components which render the circuits radiation hard will be described in detail. However, before the radiation hardness aspects of the circuits are presented, an operational description should be given from the standpoint of the RESET (CLEAR), SET, and TOGGLE modes referring to both FIGS. 1A and 1B.

CLEAR MODE

Assume that the units are initially in the SET state; i.e., transistor Q1 is in saturation and transistor Q2 is not conducting. The collectors of Q1 and Q2 provide outputs at Pins "0"and "1"respectively by way of resistors R1 and R2 and voltage source +V.

Figures 2A, 2B, 2C:
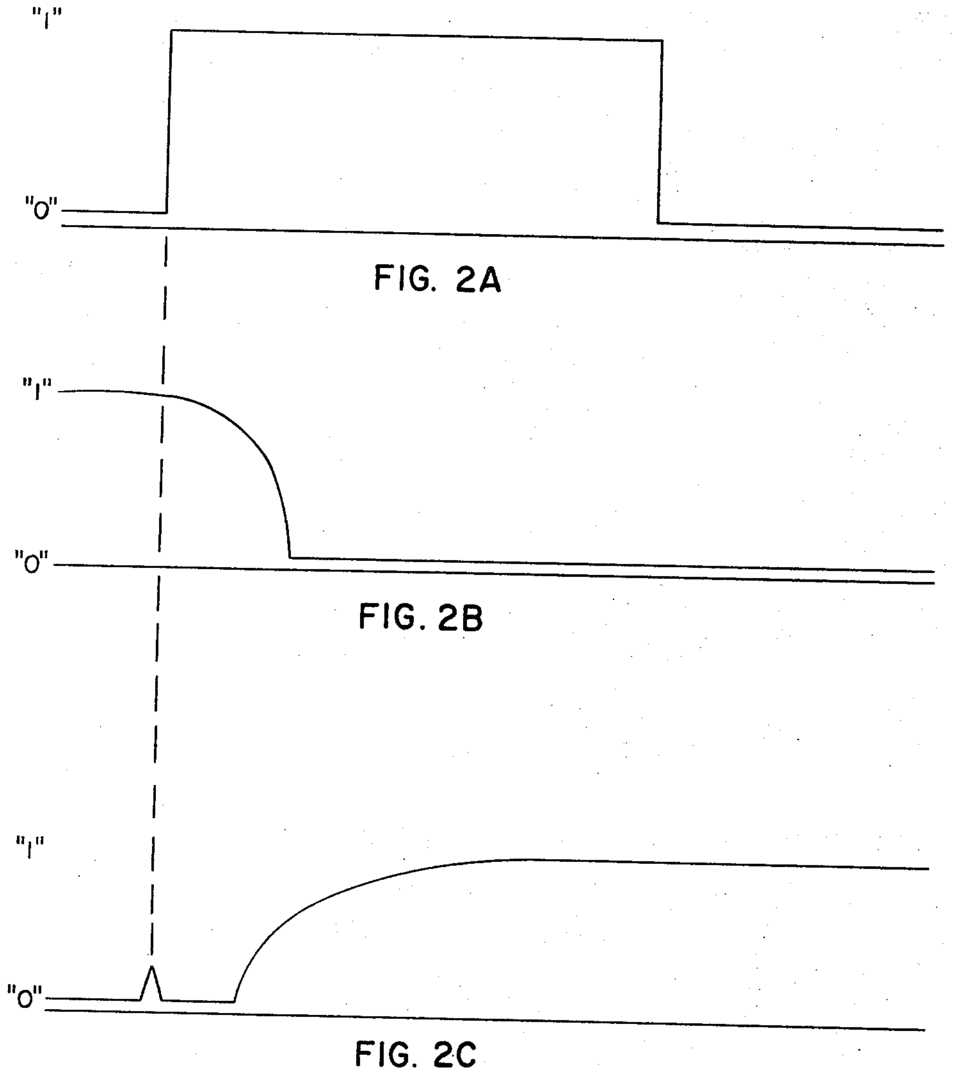
FIGS. 2A, 2B, and 2C are showings of waveforms of various components of FIGS. 1A and 1B.

The application of a positive pulse (FIG. 2A) at the input terminal designated CLEAR provides base drive to transistor Q6. In turn, the emitter of Q6 via R13 drives transistor Q2 into saturation forcing Q2's collector low (FIG. 2B). It should be noted that Q2's emitter current to ground is being conducted through L3.

As a consequence of the amplitude at Q2's collector going low, base drive through R4 (and R5, FIG. 1A) to the base of transistor Q1 is removed. Transistor Q1 subsequently turns off and the voltage at its collector rises slowly to the logic "1 "state (FIG. 2C). The reason for the slow rise-time is that as soon as Q1 turns off, the energy stored in inductor L1 supplies sufficient bias to the base of Q1 to maintain Q1 in a state of partial conduction. The Q1 emitter–L1 node is clamped at negative 0.7 volts by CR1. CR1 is forward biased to the voltage generated across L1 resulting from L1's collapsing field. As the voltage at the collector of Q1 rises, it supplies drive via R3 (and R6, FIG. 1A) to the base of Q2. Q2 has previously been driven into saturation by the CLEAR pulse. Therefore, the base drive through R3 serves to maintain Q2 in conduction and to maintain the flip-flop in the CLEAR'ed state after the CLEAR pulse has been removed.

SET MODE

Assume that the flip-flop is now in the CLEAR'ed state. The application of a positive pulse. (FIG. 2A) at the SET input terminal provides base drive to emitter follower Q5. L2 emitter of Q5, via R10, drives Q1 into saturation forcing Q1's collector low (FIG. 2B). As the drive through R3 (and R6, FIG. 1A) to the base of Q2 is removed, Q2 turns off and its collector slowly rises to the logic "the level (FIG. 2C). As the amplitude at Q2's collector rises, sufficient drive is furnished through R4 (and R5, FIG. 1A) to the base of Q1 to maintain Q1 in conduction and to maintain the flip-flop in the SET state.

TOGGLE MODE

Assume that the flip-flop is in the SET state at the onset of the TOGGLE pulse. Toggling is accomplished by applying a positive pulse to the TOGGLE input terminal. Inductor L2 differentiates the leading edge of the TOGGLE pulse which drives the bases of transistors Q3 and Q4. Since the flip-flop is in the SET state, Q1 is in saturation and inductor L1 is conducting sufficient current such that the impedance is relatively low from the emitter of Q3 to ground. However, the impedance is high from the emitter of Q4 to ground since inductor L3 is conducting virtually no current. As soon as the amplitude of the differentiated TOGGLE pulse reaches approximately 0.9 volts Q3 will turn on and shunt Q1's base current to the Q1 emitter – L1 node. Q1 will rapidly turn off, and the current through L1 will be reduced to the emitter current of Q3. The field in L1 will now collapse, and a forward biased voltage will be generated across CR1 which clamps Q3's emitter to negative 0.7 volts. The base of Q3 follows the emitter and falls from 0.9 to 0.2 volts. The rise in voltage at the collector of Q1 supplies sufficient base current through R3 and R6 to drive Q2 into saturation. Q2's collector current will increase slowly resulting from inductor L3's charging time constant. Since the fall of Q1's collector is subsequent to the transition of the toggle node from 0.9 to 0.2 volts, the circuit is prevented from retoggling after it has settled into the new state. The flip-flop may be re-toggled only after the input TOGGLE pulse has been removed for a period of approximately 50 percent of L2's discharge time constant.

In FIG. 1A resistors R5 and R6 isolate the TOGGLE function from the SET or CLEAR function and permit the SET or CLEAR function to predominate during the period of a TOGGLE pulse. For the embodiment of FIG. 1B, transistor Q7 clamps the TOGGLE node to ground during the CLEAR function.

When the flip-flop circuit is subjected to high radiations, by any cause, currents are generated in the flip-flop transistors which tend to drive them into saturation. This condition would cause the initial state of the flip-flop to be lost were it not for the action of the inductors L1 and L3. Assume that the flip-flop is in the SET state, Q1 is in conduction, and L1 is in the charged state such that the energy stored in L1 is a function of Q1's emitter current. If the level of the incident radiation dose rate is high enough to cause sufficient collector to base primary photocurrent, there will be a sufficiently high voltage drop across R2. Subsequently, the base drive of Q1 through R4 (and R5, FIG. 1A) will be removed. As soon as Q1 begins to turn off, a forward biased voltage is generated across CR1 resulting from L1's collapsing field. The amplitude of this voltage is equal to the forward drop across CR1 and is sufficient to provide adequate base to emitter bias to maintain Q1 in a state of partial conduction. Q1 remains in conduction for a period approximately equal to the time required for L1 to discharge its stored energy through CR1. This period exceeds the memory parameters desired from the circuit and may be increased of decreased, if desired, by increasing or decreasing the steady state current through L1 or L3. The period may also be increased or decreased by increasing or decreasing the values of L1 and L3. Likewise, if the flip-flop is initially in the CLEAR'ed state during a radiation pulse, L3 will maintain Q2 in conduction by establishing sufficient base to emitter bias at Q2. The period of conduction is approximately equal to the time required for L3 to discharge its energy through CR3. As was the case Q1, the base voltage with respect to the negative 0.7 volt emitter voltage will maintain Q2 in conduction throughout the anticipated radiation period.

When the flip-flop is used in a counter, the "0" output from a previous stage flip-flop feeds into the TOGGLE input. During the period of a radiation pulse this input may be pulled low for a period of time depending on the width and level of the radiation pulse. If, however, L2 is completely charged through R17 prior to the onset of the radiation pulse, the discharge time constant of L2 through CR2 would be great enough to prevent false toggling when the "0" output reverts back to the high state.

In FIG. 1A compensating diodes CR4 and CR5 are tied to the bases of Q1 and Q2 respectively to shunt the respective primary photocurrents to ground during the high radiation period. This prevents a voltage, $Ipp_{Q1}$ (R5 + R4) or $Ipp_{Q2}$ (R6 + R3), from being generated at the bases of Q1 or Q2 which would turn Q1 or Q2 on. CR2 compensates the primary photocurrents generated at the bases of Q3 and Q4 and prevents either Q3 or Q4 from turning on and false toggling the flip-flop. For the embodiment in FIG. 1B, CR6 compensates the base of Q7. Also the bases of Q1 and Q2 in FIG. 1B are adequately compensated by the collector to base junction of Q3 and Q4 respectively.

I claim:

1. In a flip-flop having first and second transistors which control the state of the flip-flop; the improvement comprising first and second inductors; first and second diodes connected respectively in shunt with said first and second inductors to form first and second parallel combinations; the first and second parallel combinations being connected respectively in series with said first and second transistors and having predetermined time constants so that when the flip-flop circuit is subjected to a high level radiation it will retain its initial state after the radiation has subsided when the time constants of the parallel combinations are greater than the length of the radiation; a toggling circuit; third inductor and third diode connected in shunt to form a third parallel combination; said third parallel combination being connected in said toggling circuit so that when a toggle signal is interrupted due to a short lived high radiation, the signal will continue when the time constant of the third parallel combination is greater than the length of the radiation; first and second resistors having first and second sides; voltage input connections; said first sides of each of said resistors being connected to one of said voltage input connections; the second side of said first and second resistors being connected respectively to one side of said first and second transistors; another side of said first and second transistors being connected respectively through said first and second parallel combinations to a second one of said voltage connections; crossover connections comprising third and fourth resistors; said third resistor being connected between a control input of said first transistor and the second side of said second resistor; said fourth resistor being connected between a control input of said second transistor and the second side of said first resistor; fourth and fifth diodes connected respectively between the control inputs of said first and second transistors and said second one of the voltage connections; said fourth and fifth diodes being connected such that they oppose normal current flow; first and second output terminals of the flip-flop connected respectively to the second side of said first and second resistors; said toggling circuit further comprising third and fourth transistors connected respectively between the respective crossover connections and respective junctions between said first and second transistors and said first and second inductors; a toggle pulse input connected to the control inputs of said third and fourth transistors; and said third combination being connected in parallel between the control inputs of said third and fourth transistors and said second one of said voltage connections.

* * * * *